United States Patent [19]

Edwards et al.

[11] Patent Number: 4,861,376

[45] Date of Patent: Aug. 29, 1989

[54] HIGH-SOLIDS ALKYL KETENE DIMER DISPERSION

[75] Inventors: Derek W. Edwards, Wilmington; David F. Townsend, Hockessin, both of Del.

[73] Assignee: Hercules Incorporated, Wilmington, Del.

[21] Appl. No.: 270,338

[22] Filed: Nov. 10, 1988

[51] Int. Cl.$^4$ .............. C08L 97/02; D21D 3/00
[52] U.S. Cl. .................. 106/123.1; 106/160; 106/211; 106/243; 162/158; 162/175; 162/179
[58] Field of Search ............ 106/211, 243, 123.1, 106/160; 162/175, 179

[56] References Cited

U.S. PATENT DOCUMENTS

| | | | |
|---|---|---|---|
| 3,223,543 | 12/1965 | Savina | 106/211 |
| 4,240,935 | 12/1980 | Dumas | 162/158 |
| 4,405,408 | 9/1983 | Yoshioka et al. | 162/158 |
| 4,522,686 | 6/1985 | Dumas | 106/218 |

FOREIGN PATENT DOCUMENTS 2306542  8/1974  Fed. Rep. of Germany.
2514128 10/1976  Fed. Rep. of Germany.

*Primary Examiner*—Theodore Morris
*Attorney, Agent, or Firm*—Ivan G. Szanto

[57] ABSTRACT

Stable high solids dispersions of ketene dimer are provided by using water soluble carboxylic acid, e.g. acetic acid with cationic starch, sodium lignin sulfonate and aluminum sulfate.

16 Claims, No Drawings

HIGH-SOLIDS ALKYL KETENE DIMER DISPERSION

BACKGROUND OF THE INVENTION

1. Field of the Invention

The present invention relates to the sizing of paper and more particularly it relates to stable dispersions of high solids alkyl ketene dimer sizing agents.

2. Description of the Prior Art

An aqueous dispersion of alkyl ketene dimer forms the basis for a well known and valuable sizing formulation in the manufacture of paper. This value arises mostly from the cost efficiency of the ketene dimer, which bonds directly to the hydroxyl groups on the cellulose fibers. In addition, ketene dimers are noted as sizing agents for paper made at a neutral or slightly alkaline pH.

As an added convenience to the paper maker, ketene dimers are normally sold as aqueous dispersions. These dispersions are generally prepared with cationic starch and sodium lignin sulfonate, because both are inexpensive and have FDA approval.

By emulsion we mean a two phase system with liquid droplets in a continuous liquid medium. By dispersion we mean a two phase system with solid particles in a continuous liquid medium. Alkyl ketene dimer has a melting point of about 45° C. Therefore, mixtures of alkyl ketene dimer in water are emulsions above 50° C. and dispersions below 40° C.

To be useful, the dispersion must remain fluid enough to be pumped and diluted up until the time it is added to the paper machine. Often, this is a matter of weeks, with average temperatures as high as 32° C. If the dispersion could meet these conditions it would be colloidally stable. Historically, it has been difficult to meet these conditions, because of the inherent colloidal instability of these dispersions. An unstable ketene dimer dispersion will increase in viscosity until it cannot be pumped or even until it gels. This problem gets worse as the dimer solids are increased, thus limiting the total solids to less than 15% for most systems.

The process of stabilizing lower solids content alkyl ketene dimer with cationic starch and sodium lignin sulfonate is well known. Savina U.S. Patent 3,223,544 (American Cyanamid) discloses the use of sodium lignin sulfonate or sodium naphthalenesulfonate-formaldehyde resin together with cationic starch to make their emulsion, containing about 6% by weight AKD, agglomerate free, while keeping the pH between 3 and 5.

One example of making ketene dimer dispersions at solids higher than 15% is in Dumas U.S. Patent 4,240,935 (Hercules), disclosing a dispersion of AKD, water soluble cationic resin (e.g. epichlorohydrin derivative), and sodium lignin sulfonate and/or sodium naphthalene sulfonate-formaldehyde resin as anionic surfactants.

There are other examples of high solids AKD dispersions containing synthetic resins. Belgian Patent 817,130 (Tenneco) teaches that the known ketene dimer cationic starch emulsifier combinations having solids content above 12% result in products that increase in viscosity so much that even after one week of storage at ordinary temperatures they turn into pastes that are difficult or impossible to pour, pump or meter. The patent discloses that they have found that stable, high solids ketene dimer dispersions can be prepared without the use of cationic starch using polyvinyl alcohol and sodium ligno-sulphonate as the emulsifiers. Accordingly, they disclose 25% AKD dispersions containing polyvinyl alcohol, sodium lignosulphonate, dicyandiamide/formaldehyde condensate and hydrochloric acid.

German OLS 2,306,542 (BASF) discloses that the common emulsifier for alkyl ketene dimers, i.e. amine modified cationic starches, permit preparation of only dilute dispersions of AKD. They found that higher, i.e. up to 30 weight percent alkyl ketene dimer containing dispersions can be made by adjusting the pH to 3-4.5 and by using a polyvinyl alcohol protective colloid. The pH is adjusted with organic carboxylic acids, for example, acetic acid, propionic acid, lactic acid or particularly with polymeric carboxylic acids, such as polyacrylic acids. Preferably they also add small amounts of benzene, toluene, cyclohexene, or octane to the molten alkyl ketene dimer before emulsification in order to obtain the high solids dispersion at the lower consistency. In addition, the use of surfactants and fungicides is also disclosed. The acetic acid is used in an amount of about 2% based on the dimer even when only a 10% solids dispersion was obtained.

German OLS 2,514,128 (BASF) teaches that it is known to use aqueous dispersions of ketene dimers with amine modified starch; however, these have the disadvantages that they must be used in low solids levels of about 3-8 weight percent in order to avoid dispersions having excessively high viscosity. They disclose that the object of obtaining high solids dispersions having better sizing action was solved by using polyvinyl lactam, such as polyvinylpyrrolidone and polyvinyl caprolactam and anionic, cationic or nonionic emulsifiers. To improve storage stability, they employ water insoluble inert solvents, preferably low boiling hydrocarbons such as benzene, toluene, cyclohexane, etc. The patent teaches adjusting the pH of the emulsions to 2-4.5 with organic acids such as formic, acetic, propionic, or malonic acid advantageously, employing one carboxy group of the water soluble organic acid for each unit of vinyl lactam monomer in the polyvinyl lactams. In addition, the use of fungicides is also disclosed. They disclose obtaining dispersions with 0.01 to 30 percent by weight of ketene dimer.

SUMMARY OF THE INVENTION

According to the present invention, there is provided an aqueous dispersion comprising (a) from about 12 to about 30% by weight of ketene dimer, (b) from about 10 to about 30%, based upon the weight of dimer, of water soluble cationic starch, (c) from about 1 to about 5%, based upon the weight of dimer, of sulfonate selected from the group consisting of salts of lignin sulfonic acid and the condensation product of formaldehyde and salts of naphthalene sulfonic acid and mixtures thereof, (d) from about 0.15 to about 1.5%, based upon the weight of dimer, of aluminum sulfate, and (e) from about 0.1 to about 5%, based upon the weight of dimer, of carboxylic acid having from 1 to 10 carbon atoms, a pKa of up to about 5 and water solubility of at least about 0.1 parts in 100 parts, said aqueous dispersion being colloidally stable as evidenced by a viscosity increase of less than 100 centistokes upon quiescent aging at 32° C. (90° F.) for a period of at least 4 weeks.

DETAILED DESCRIPTION OF THE INVENTION

The surprising discovery has now been made that by combining a small amount of low molecular weight carboxylic acid with cationic starch, sodium lignin sulfonate and aluminum sulfate, the colloidal stability of the cooled dispersion is increased even at the 30% by weight ketene dimer solids level. These dispersions remain fluid for more than four weeks at 32° C. This result is surprising because carboxylic acids are not known to be dispersion stabilizers. The same benefit is not seen when sulfuric, hydrochloric or other mineral acids are used without the organic acid.

The ketene dimers have the following general formula:

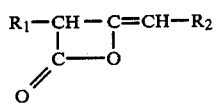

where $R_1$ and $R_2$ are, respectively, hydrocarbon groups having 8-30 carbon atoms.

Included in, but not limited to these, are octyl, decyl, dodecyl, tetradecyl, hexadecyl, octadecyl, eicosyl, docosyl, tetracosyl, phenyl, benzyl, beta-napthyl and cyclohexyl ketene dimers. In addition, naturally occurring mixtures of fatty acids, such as those mixtures in coconut oil, babassu oil, palm kernel oil, palm oil, olive oil, peanut oil, rape oil, beef tallow, lard (leaf) and whale blubber are also useful for the preparation of dimers.

Preferred dimers are wherein the $R_1$ and $R_2$ in the above formula is saturated or monounsaturated hydrocarbon group having 12-20 carbon atoms.

The most preferred dimers are wherein $R_1$ and $R_2$ is saturated hydrocarbon group having 14-16 carbon atoms, such as hexadecyl and octadecyl ketene dimers and their mixtures.

Stable dispersions can be made within the range of from about 12 to about 30 weight percent ketene dimer. The preferred concentration of ketene dimer in these dispersions is from about 15 to about 25 weight percent, most preferably about twenty weight percent. The preferred and most preferred concentration is a compromise between longer shelf life for lower solids dispersions and more efficiency for higher solids dispersions.

The carboxylic acids used in the present invention contain from 1 to 10 carbon atoms having a pKa of five or less, and a solubility in water of at least 0.1 parts in 100 parts. They can contain substituted hetero-atoms, such as nitrogen, the halogens, and sulfur. Included in, but not limited to these, are acetic, adipic, citric, formic, fumaric, lactic, itaconic, benzoic, phthalic, 2-hydroxybenzoic, 3-hydroxybenzoic, 4-hydroxybenzoic, propionic, butyric, pentanoic, hexanoic, heptanoic, 2-ethylhexanoic, nitroacetic, 2-nitropropanoic, chloroacetic, bromoacetic, mercaptoacetic, and 1-mercaptopropionic acids.

In general, mono-protic carboxylic acids, without an adjacent hydroxy group, and 0.1 parts solubility in 100 parts water, are preferred, because di- and tri-protic acids do not work as well, and hydroxy groups can react with the ketene dimer. The best of the monoprotic acids is acetic acid. Acetic acid is most preferred, because it gives the lowest initial viscosity and particle size, combined with the least amount of hydrolysis of the dimer and it has FDA approval.

The next best set of acids are lactic, adipic, citric, fumaric, itaconic, and salicylic acids. These are diprotic acids, tri-protic acids, or hydroxysubstituted acids. Lactic and salicylic both had excellent shelf-life equal to or better than acetic acid, but both reduced the assay of the ketene dimer, and salicylic acid was only marginally soluble in water. The others produced dispersions that did not last as long as acetic acid.

The acid is generally present in an amount of from about 0.1 to about 5% by weight dimer, preferably from about 0.15 to about 0.5% by weight and most preferably from about 0.2 to about 0.3% by weight.

The cationic starch stabilizer used in the present invention is any water soluble starch carrying sufficient cationic amino groups to render the starch positively charged in solution. The preferred starches are cationic waxy maize starches of low to moderate viscosity (Brookfield viscosity of from about 50 to about 200 cst), with either tertiary or quaternary amino groups as the source of the charge. The best starches to use are tertiary amine modified waxy maize having a Brookfield viscosity of from about 50 to about 80 cst, such as Amaizo 2187 (sold by American Maize-Products Co.) or a quaternary amine modified waxy maize of the same viscosity, such as Stalok 140 (sold by A. E. Staley Manufacturing Co.).

In the context of the present invention, moderate viscosity means a Brookfield viscosity of from about 101 to about 200 centistokes (cst) measured with a #2 spindle at 100 rpm and 38° C. (100° F.) using a 10% by weight solution of starch in water at a natural pH of 4.5-60., after cooking at 95° C. for 30 minutes. Low viscosity means a Brookfield viscosity of from about 50 to about 100 cst.

The starch can be present in an amount of from about 10 to about 30% by weight dimer. Preferably the starch is present in an amount of from about 15 to about 25% by weight and most preferably from about 18 to about 22% by weight.

The sulfonate stabilizers of the present invention are various salts of lignin sulfonic acid and the condensation product of formaldehyde and various salts of naphthalene sulfonic acid and mixtures thereof.

The type of salt formed from the acids is important for colloid stability and cost efficiency. Alkali metal, alkaline earth metal and ammonium salts of lignin sulfonic and naphthalene sulfonic acid are suitable. Ammonium, calcium, magnesium potassium, and sodium salts are preferred, because they are more readily available, and they are less expensive. Calcium and other divalent ions raise the ionic strength of the continuous phase much more than sodium ions.

This extra ionic strength does not favor dispersion stability. Ammonia can react with ketene dimer to form a compound that does not size. This lessens the sizing efficiency of ketene dimer dispersions stabilized with the ammonium salt. Accordingly, the sodium salt is most preferred. it increases ionic strength the least thus enhancing the colloid stability of the ketene dimer dispersion. Also the sodium salt does not react with the ketene dimer and therefore it does not lessen sizing efficiency.

The sulfonate stabilizer is useful in an amount of from about 1 to about 5% by weight ketene dimer. Its preferred range is from about 1.8 to about 4% and the most preferred range is from about 2 to about 2.2% by weight.

Aluminum sulfate is a necessary ingredient to obtain the best stability. Its level should be from about 0.15% to about 1.5% by weight ketene dimer, preferably from about 0.15 to about 0.6% by weight and most preferably from about 0.3 to about 0.5% by weight. As the solids are increased so should the amount of aluminum sulfate.

The best formulation depends upon the total solids desired. The ratio of the ingredients in the four-part formula must be varied as the amount of dimer is increased. At 12% solids a ratio of 6 parts starch to 1 part sodium lignin sulfonate, and 4 parts dimer to one part starch may be used with up to 0.5 parts of acetic acid with satisfactory results. As the solids increase to 30 parts dimer, the ratio of dimer to starch becomes 5:1, the ratio of starch to sodium lignin sulfonate becomes 10:1, and the amount of organic acid decreases to 0.1 parts by weight dimer.

The following examples are given for the purpose of illustrating the present invention. All parts and percentages are by weight unless otherwise indicated.

EXAMPLES

Stability of the ketene dimer dispersions were based on the change in viscosity after aging, either on a shelf at room temperature (shelf-life), or in a 32° C. oven. The aging period was not less than four weeks. The viscosity was measured with a Brookfield viscometer, number two spindle, at 60 rpm. Dispersions with viscosities above 100 cst are normally not useful in practice.

EXAMPLE 1

(1) Charges
For a 1500 gram batch:

| | |
|---|---|
| 300 g | Alkyl Ketene Dimer |
| 67.5 g | Cationic Starch (Amaizo 2187) |
| 6 g | Sodium Lignin Sulfonate (Lignasol XD) |
| 15 g | Acetic Acid (at 5% by weight) |
| 19.8 g | Aluminum Sulfate (Reagent at 5% by weight in water) |
| 1.5 g | Biocide N521 |
| 1090.2 g | Water (Distilled) |

(2) Procedure

To 1090.2 grams of distilled water were added 67.5 grams of cationic starch (commercially available as Amaizo 2187, which has 13% bound water) and 6 grams of sodium lignin sulfonate (commercially available as Lignasol XD sold by Reed Lignin Inc.). The pH was adjusted to 5.5 with 0.1 M HCl. The mixture was weighed after heating and the water lost during heating was added back along with 15 grams of 5% by weight acetic acid. After cooling to 80° C., 300 grams of a mixture of hexadecyl and octadecyl ketene dimer flake (sold as Aquapel® 364 by Hercules Incorporated) were blended in and melted. The temperature was adjusted to 65° C. (as necessary). The mixture was circulated through a Gaulin model 15M single stage laboratory homogenizer without pressure and then with 3000 psig applied (all at 65° C.) for one pass. The total solids of the mixture was determined by placing 1.5 grams in a 150° C. oven for 15 minutes. From this the percent ketene dimer actually present was calculated. To the hot homogenizate was added 0.33% (by weight ketene dimer) of a 5% by weight solution of reagent grade aluminum sulfate. The homogenizate was cooled to 25° C., and 1.5 grams of tetrahydro-3,5- dimethyl-2H-1,3,5-thiadiazine-2-thione (Biocide N521 sold by Vinings Chemical Co. of Atlanta, GA) was added. The pH was adjusted to 3.6 with 0.1 M HCl (as necessary) after waiting two hours for equilibration.

(3) Stability result

Viscosity as made was 20 cst. Viscosity after 5 weeks at 32° C. was 35 cst. This small increase in viscosity satisfies out test for stability indicating that the present invention results in alkyl ketene dimer dispersed well enough to be practical.

EXAMPLE 2

This example compares the stability of dispersions of alkyl ketene dimer made with and without acetic acid. The procedure is the same for all dispersions at any level of ketene dimer, with the exception of the acetic acid. The amount for each ingredient is given in terms of ketene dimer. The dimer amount will vary between 6 and 20% of the total dispersion and is represented by "X" in the recipe. The amount of water required for each level of ketene dimer can be calculated using the equation at the end of parts (1) and (3).

(1) Charges For Ketene Dimer Dispersions at 20% with Acetic Acid

For a 500 gram Batch (with all additives by weight dimer)

| | |
|---|---|
| X% | Alkyl Ketene Dimer (Where X is the % dimer listed in Table 1.) |
| 22.5% | Cationic Starch (Amaizo 2187) |
| 2.0% | Sodium Lignin Sulfonate (Lignasol XD) |
| 6.6% | Aluminum Sulfate (Reagent at 5% by weight in water) |
| 0.5% | Biocide N521 |

Grams 0.01M Acetic acid solution = 500 − 500[X + 0.225X 0.039X + 0.066X + 0.005X]

(2) Procedure for Ketene Dimer Dispersions at 20% by weight with Acetic Acid. (100 g Ketene Dimer)

To 368.4 grams of 0.01M acetic acid in water were added 22.5 grams of starch (Amaizo 2187) and 2 grams of sodium lignin sulfonate (Lignasol XD). The pH was adjusted to 5.5 with 0.1M HCl. The mixture was weighed after heating and the acetic acid solution that was evaporated off was added back. After cooling to 80° C., 100 grams of a mixture of hexadecyl and octadecyl ketene dimer flake (Aquapel® 364) were blendd in and melted. The temperature was adjusted to 65° C. (as necessary). The mixture was sheared in a Microfluidics model T110 Microfluidizer (at 65° C.) at 3000 psig for one minute. The total solids of the mixture was determined by placing 1.5 grams in a 150° C. oven for 15 minutes. From this the percent ketene dimer actually present was calculated. To the hot homogenizate was added 0.33% (by weight ketene dimer) of a 5% by weight solution of reagent grade aluminum sulfate. The homogenizate was cooled to 25° C., and 0.5 grams of biocide N521 was added. The pH was adjusted to 3.6 with 0.1 M HCl (as necessary) after waiting two hours for equilibration.

To get the ratio of ingredients for lower solids dispersions, put the percent ketene dimer in for "X" in the charges section above. For example, a 6% dispersion would have 0.06 times 500 g or 30 g of ketene dimer, 6.75 g of starch, 1.17 g of Sodium lignin sulfonate, 1.98 g of 5% alum solution, 0.15 g biocide, and 460.5 g of 0.01M acetic acid solution.

(3) Charges for Ketene Dimer Dispersions at 20% without Acetic Acid

For a 500 gram Batch (with all additives by weight dimer)

| | |
|---|---|
| X% | Alkyl Ketene Dimer (Where X is the % dimer listed in Table 1.) |
| 22.5% | Cationic Starch (Amaizo 2187) |
| 3.9% | Sodium Lignin Sulfonate (Lignasol XD) |
| 6.6% | Aluminum Sulfate (Reagent at 5% by weight in water) |
| 0.5% | Biocide N521 |

Grams Water = 500 − 500(X = 0.225X = 0.039X = 0.066X + 0.005X) (distilled)

(4) Procedure for Ketene Dimer Dispersions at 20% by weight without Acetic Acid

Those dispersions made without acetic acid followed the above procedure of this example, but with the above charge, and distilled water was used instead of 0.01M acetic acid. Again, the additives were given in percent ketene dimer and the amount of water was found by the equation at the end of the charge section.

TABLE 1

| Viscosities of Ketene Dimer Dispersions in Centistokes | | | |
|---|---|---|---|
| Dispersion | As Made | 4 Weeks: 25° C. | 8 Weeks: 25° C. |
| 6% dimer with acetic acid | 4.0 | 7.5 | 7.5 |
| 6% dimer without acetic acid | 3.5 | 7.5 | 5.0 |
| 12% dimer with acetic acid | 5.0 | 10.0 | 15.0 |
| 12% dimer without acetic acid | 6.0 | 10.0 | 17.5 |
| 15% dimer with acetic acid | 7.0 | 12.5 | 15.0 |
| 15% dimer without acetic acid | 9.0 | 20.0 | 80.0 |
| 20% dimer with acetic acid | 21.0 | 37.5 | 155.0 |
| 20% dimer without acetic acid | 35.0 | 117.0 | gel |

Alkyl ketene dimer dispersions made with acetic acid, according to the present invention, pass the four week stability test. Dispersions of ketene dimer made without acetic acid fail the test at 20% dimer solids. Since four weeks stability is required to be commercially useful, carboxylic acid is an essential ingredient.

EXAMPLE 3

(1) Charges

For a 1500 gram batch:

| | |
|---|---|
| 300 g | Alkyl Ketene Dimer |
| 1.5 g | Biocide N521 |
| about 1090 g | Water (Distilled) | all other additives given in Table 2 in percent by weight based on ketene dimer.

(2) Procedure

The procedure is identical to Example 1 with the proper adjustments made for the variation in the levels of the starch, sodium lignin sulfonate, acetic acid, and aluminum sulfate.

TABLE 2

| Starch | SLS | Acetic Acid | Alum | AKD % by wt of Dispersion | Viscosity (cst) As made | 2 months at 32° C. |
|---|---|---|---|---|---|---|
| 23.0 | 1.8 | .25 | .40 | 20 | 20 | 63 |
| 20.5 | 2.0 | .28 | .35 | 20 | 20 | 65 |
| 20.5 | 2.0 | .25 | .35 | 20 | 20 | 80 |
| 20.5 | 2.2 | .25 | .35 | 20 | 15 | 80 |
| 23.0 | 2.2 | .28 | .30 | 20 | 20 | 110 |
| 25.5 | 1.8 | .25 | .35 | 20 | 20 | 205 |
| 20.5 | 2 | .23 | .4 | 20 | 20 | 215 |

A change of 10% in any of the essential ingredients will not cause the dispersion of ketene dimer to fail. Therefore, there is sufficient flexibility in the composition of the dispersions of the present invention to allow successful commercial application.

EXAMPLE 4

(1) Charges

For a 1500 gram batch:

| | |
|---|---|
| 450 g | Alkyl Ketene Dimer |
| 102.6 g | Cationic Starch (Amazo 2187) |
| 9 g | Sodium Lignin Sulfonate (Lignasol XD) |
| 22.5 g | Acetic Acid (at 5% by weight) |
| 39.6 g | Aluminum Sulfate (Reagent at 5% by weight in water) |
| 2.3 g | Biocide N521 |
| 874 g | Water (Distilled) |

(2) Procedure

This procedure was the same as in Example 1.

(3) Stability result

Viscosity as made was 110 cst. The dispersion was fluid for three weeks and gelled after four weeks at 32° C.

We claim:
1. An aqueous dispersion consisting essentially of
   (a) from about 12 to about 30% by weight of ketene dimer having the general formula

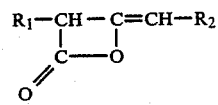

where $R_1$ and $R_2$ are hydrocarbon groups having from 8 to 30 carbon atoms;
   (b) from about 10 to about 30%, based upon the weight of dimer, of water soluble cationic starch carrying sufficient cationic amino groups to render the starch positively charged in solution;
   (c) from about 1 to about 5%, based upon the weight of dimer, of sulfonate selected from the group consisting of salts of lignin sulfonic acid and the condensation product of formaldehyde and salts of naphthalene sulfonic acid and mixtures thereof.
   (d) from about 0.15 to about 1.5%, based upon the weight of dimer, of aluminum sulfate; and
   (e) from about 0.1 to about 5%, based upon the weight of dimer, of carboxylic acid having from 1 to 10 carbon atoms, a pKa of up to about 5 and water solubility of at least about 0.1 parts in 100 parts,
said aqueous dispersion being colloidally stable as evidenced by a viscosity increase of less than 100 centistokes upon quiescent aging at 32° C. for a period of at least 4 weeks.

2. The aqueous dispersion of claim 1 wherein $R_1$ and $R_2$ of the ketene dimer is selected from the group consisting of saturated and monounsaturated hydrocarbon groups having from 12 to 20 carbon atoms.

3. The aqueous dispersion of claim 1 wherein the carboxylic acid is selected from the group consisting of formic acid, acetic acid, propionic acid, butyric acid, pentanoic acid, hexanoic acid, heptanoic acid, 2-ethylhexanoic acid, adipic acid, citric acid, fumaric acid, lactic acid, itaconic acid, salicylic acid, benzoic acid, phthalic acid, 2-hydroxybenzoic acid, 3-hydroxybenzoic acid, 4-hydroxybenzoic acid, and picric acid.

4. The aqueous dispersion of claim 1 wherein the starch is tertiary or quaternary amine modified waxy maize starch having a Brookfield viscosity of from about 50 to about 200 centistokes.

5. The aqueous dispersion of claim 1 wherein the salt of the lignin sulfonic acid and naphthalene sulfonic acid is selected from the group consisting of alkali metal, alkaline earth metal and ammonium salts.

6. The aqueous dispersion of claim 5 wherein the salt of the lignin sulfonic acid and naphthalene sulfonic acid is selected from the group consisting of potassium, sodium, calcium, magnesium and ammonium salts.

7. The aqueous dispersion of claim 1 wherein the ketene dimer is present in an amount of from about 15 to about 25% by weight, the starch is present in an amount of from about 5 to about 25% by weight dimer, the sulfonate is present in an amount of from about 1.8 to about 4% by weight dimer, the aluminum sulfate is present in an amount of from about 0.15 to about 0.6% by weight dimer, and the carboxylic acid is present in an amount of from about 0.15 to about 0.5% by weight dimer.

8. The aqueous dispersion of claim 3 wherein $R_1$ and $R_2$ of the ketene dimer is selected from the group consisting of saturated and monounsaturated hydrocarbon groups having from 12 to 20 carbon atoms, the starch is tertiary or quaternary amine modified waxy maize starch having a Brookfield viscosity of from about 50 to about 200 centistokes, the salt of the lignin sulfonic acid and naphthalene sulfonic acid is selected from the group consisting of potassium, sodium, calcium, magnesium and ammonium salts, the ketene dimer is present in an amount of from about 15 to about 25% by weight, the starch is present in an amount of from about 15 to about 25% by weight dimer, the sulfonate is present in an amount of from about 1.8 to about 4% by weight dimer, the aluminum sulfate is present in an amount of from about 0.15 to about 0.6% by weight dimer, and the carboxylic acid is present in an amount of from about 0.15 to about 0.5% by weight dimer.

9. The aqueous dispersion of claim 3 wherein the acid is mono-protic carboxylic acid without an adjacent hydroxy group.

10. The aqueous dispersion of claim 8 wherein the carboxylic acid is mono-protic carboxylic acid without an adjacent hydroxy group.

11. The aqueous dispersion of claim 10 wherein $R_1$ and $R_2$ of the ketene dimer is selected from the group consisting of saturated hydrocarbon groups having from 14 to 16 carbon atoms.

12. The aqueous dispersion of claim 10 wherein the carboxylic acid is acetic acid.

13. The aqueous dispersion of claim 10 wherein the starch is tertiary amine modified waxy maize starch having a Brookfield viscosity of from about 60 to about 80 centistokes.

14. The aqueous dispersion of claim 10 wherein the sulfonate is sodium lignin sulfonate.

15. The aqueous dispersion of claim 10 wherein the ketene dimer is present in an amount of about 20% by weight, the starch is present in an amount of from about 18 to about 22% by weight dimer, the sulfonate is present in an amount of from about 2 to about 2.2% by weight dimer, the aluminum sulfate is present in an amount of from about 0.3 to about 0.5% by weight dimer, and the carboxylic acid is present in an amount of from about 0.2 to about 0.3% by weight dimer.

16. The aqueous dispersion of claim 11 wherein the carboxylic acid is acetic acid, the starch is tertiary amine modified waxy maize starch having a Brookfield viscosity of from about 60 to about 80 centistokes, the sulfonate is sodium lignin sulfonate and the ketene dimer is present in an amount of about 20% by weight, the starch is present in an amount of from about 18 to about 22% by weight dimer, the sulfonate is present in an amount of from about 2 to about 2.2% by weight dimer, the aluminum sulfate is present in an amount of from about 0.3 to about 0.5% by weight dimer, and the carboxylic acid is present in an amount of from about 0.2 to about 0.3% by weight dimer.

* * * * *

UNITED STATES PATENT AND TRADEMARK OFFICE
CERTIFICATE OF CORRECTION

PATENT NO. : 4,861,376

DATED : August 29, 1989

INVENTOR(S) : Derek Wayne Edwards and David Francis Townsend

It is certified that error appears in the above-identified patent and that said Letters Patent is hereby corrected as shown below:

Column 6, line 39, delete the number "0.039" and substitute therefor the number --0.02--; and Column 7, line 18, delete the second, third and fourth occurrence of the symbol " = " and substitute therefor the symbol -- + --.

Signed and Sealed this

Sixth Day of November, 1990

Attest:

HARRY F. MANBECK, JR.

Attesting Officer

Commissioner of Patents and Trademarks